United States Patent
Gorney et al.

(10) Patent No.: US 11,788,498 B1
(45) Date of Patent: Oct. 17, 2023

(54) ENGINE START/STOP SYSTEM FOR PARK CONDITIONS

(71) Applicant: FCA US LLC, Auburn Hills, MI (US)

(72) Inventors: Anthony N Gorney, Oxford, MI (US);
Stephanie R Beck, Pinckney, MI (US);
Roger C Sager, Munith, MI (US);
Scott E Henson, Chelsea, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/159,740

(22) Filed: Jan. 26, 2023

(51) Int. Cl.
*F02N 11/08* (2006.01)
*B60Q 9/00* (2006.01)

(52) U.S. Cl.
CPC ............ *F02N 11/0822* (2013.01); *B60Q 9/00* (2013.01); *F02N 2200/0802* (2013.01); *F02N 2200/0806* (2013.01); *F02N 2200/102* (2013.01)

(58) Field of Classification Search
CPC ......... F02N 11/0822; F02N 2200/0802; F02N 2200/0806; F02N 2200/102; B60Q 9/00
See application file for complete search history.

(56) References Cited

U.S. PATENT DOCUMENTS

| | | | |
|---|---|---|---|
| 6,190,284 B1 | 2/2001 | Kuroda et al. | |
| 6,802,291 B2 | 10/2004 | Ujifusa | |
| 8,574,123 B2 | 11/2013 | Nedorezov et al. | |
| 8,616,169 B2 | 12/2013 | Levasseur et al. | |
| 8,690,731 B1* | 4/2014 | Sangameswaran ... | B60W 10/06 477/111 |
| 8,702,563 B1 | 4/2014 | Sangameswaran et al. | |
| 9,731,698 B1* | 8/2017 | Khafagy ............. | F02N 11/0822 |
| 9,731,722 B2 | 8/2017 | Khafagy et al. | |
| 10,017,174 B2 | 7/2018 | Wang et al. | |
| 10,065,646 B2 | 9/2018 | Yamada | |
| 2017/0356415 A1* | 12/2017 | Khafagy ............... | B60W 10/06 |
| 2019/0088043 A1* | 3/2019 | Henson ................ | G07C 5/0808 |
| 2019/0323471 A1* | 10/2019 | Henson ................... | F16H 63/50 |
| 2020/0255014 A1* | 8/2020 | Meroux ................. | G06N 3/045 |
| 2021/0323503 A1* | 10/2021 | Lee ......................... | H04L 67/56 |
| 2022/0242386 A1 | 8/2022 | Yorke et al. | |

* cited by examiner

*Primary Examiner* — Xiao En Mo
(74) *Attorney, Agent, or Firm* — Jeremy J. Klobucar

(57) ABSTRACT

An automatic engine stop-start (ESS) system for a vehicle with an internal combustion engine includes a brake pedal, a gear shifter configured to shift a transmission between park, reverse, neutral, and drive, and a controller. The controller is configured to command an ESS engine stop when the gear shifter is in drive, the vehicle is stopped, and the brake pedal is pressed, prevent an ESS engine restart when the gear shifter is shifted from drive to park, and provide, when the ESS engine restart is prevented, a warning notification to a driver that the engine is keyed-on.

19 Claims, 3 Drawing Sheets

ENGINE START/STOP SYSTEM FOR PARK CONDITIONS

FIELD

The present application generally relates to automatic stop-start engine systems and, more particularly, to systems and methods for preventing automatic restart when the vehicle is shifted to park.

BACKGROUND

Many newer vehicles are equipped with an automatic stop-start system that automatically shuts down and restarts the vehicle engine to reduce fuel consumption. For example, the vehicle engine may be automatically turned off when the vehicle comes to a stop at a traffic signal, and automatically started when the driver releases the brake pedal. However, current stop-start equipped vehicles will turn the engine on whenever the vehicle shifter is put into park, which may be undesirable as it potentially increases fuel consumption, emissions, and engine wear. Accordingly, while such vehicle systems do work well for their intended purpose, there remains a need for improvement in the relevant art.

SUMMARY

According to one example aspect of the invention, an automatic engine stop-start (ESS) system for a vehicle with an internal combustion engine is provided. In one exemplary implementation, the ESS system includes a brake pedal, a gear shifter configured to shift a transmission between park, reverse, neutral, and drive, and a controller. The controller is configured to command an ESS engine stop when the gear shifter is in drive, the vehicle is stopped, and the brake pedal is pressed, prevent an ESS engine restart when the gear shifter is shifted from drive to park, and provide, when the ESS engine restart is prevented, a warning notification to a driver that the engine is keyed-on.

In addition to the foregoing, the described ESS system may include one or more of the following features: wherein the controller includes a driver intent logic configured to interpret a series of inputs to determine a desired/anticipated vehicle state of an operator of the vehicle, wherein the ESS engine restart is commanded or prevented based on a signal from the driver intent logic; wherein the driver intent logic provides a signal indicating to prevent the ESS engine restart when a vehicle camera/proximity sensor system indicates the vehicle is stopped in a parking spot, near a building, or in a garage; and wherein the driver intent logic provides a signal indicating to prevent the ESS engine restart when a vehicle GPS system and/or map data indicate the vehicle has reached a HOME location or a recurring ignition-off location.

In addition to the foregoing, the described ESS system may include one or more of the following features: wherein the controller is further configured to continue to prevent the ESS engine restart and provide the warning notification if the gear shifter remains in park and the brake pedal is released; wherein the controller is further configured to command the ESS engine restart when the brake pedal is pressed and the gear shifter is shifted from park to drive or reverse; wherein the warning notification is an audible warning; wherein the warning notification is a visual warning displayed on a vehicle display or a haptic warning; and wherein the controller is configured to provide the warning notification to an electronic user device paired with the vehicle.

In addition to the foregoing, the described ESS system may include one or more of the following features: wherein the controller is further configured to perform the ESS engine restart when an HVAC system operation is requested that requires the engine on; wherein the controller is further configured to perform the ESS engine restart when an electrical system supply voltage is below a predetermined threshold; and wherein the controller is further configured to perform the ESS engine restart when a vehicle hood is ajar, a vehicle driver door is ajar, or a driver seat belt is unlatched.

According to another example aspect of the invention, a method of controlling an automatic engine stop-start (ESS) system for a vehicle having an internal combustion engine is provided. In one example, the method includes monitoring, with a controller, a brake pedal to determine if the brake pedal is pressed or released, monitoring, with the controller, a position of a gear shifter configured to shift a transmission between park, reverse, neutral, and drive, and commanding, with the controller, an ESS engine stop when the gear shifter is in drive, the vehicle is stopped, and the brake pedal is pressed. The method further includes preventing, with the controller, an ESS engine restart when the gear shifter is shifted from drive to park, and providing, with the controller, a warning notification to a driver that the engine is keyed-on when the ESS engine restart is prevented.

In addition to the foregoing, the described method may include one or more of the following features: wherein the controller includes a driver intent logic configured to interpret a series of inputs to determine a desired/anticipated vehicle state of an operator of the vehicle, wherein the ESS engine restart is commanded or prevented based on a signal from the driver intent logic; providing a signal from the driver intent logic indicating to prevent the ESS engine restart when a vehicle camera/proximity sensor system indicates the vehicle is stopped in a parking spot, near a building, or in a garage, and providing a signal from the driver intent logic indicating to prevent the ESS engine restart when a vehicle GPS system and/or map data indicate the vehicle has reached a HOME location or a recurring ignition-off location.

In addition to the foregoing, the described method may include one or more of the following features: continuing to prevent the ESS engine restart and provide the warning notification if the gear shifter remains in park and the brake pedal is released; commanding, with the controller, the ESS engine restart when the brake pedal is pressed and the gear shifter is shifted from park to drive or reverse; and wherein the warning notification is at least one of an audible warning, a visual warning displayed on a vehicle display, and a haptic warning.

In addition to the foregoing, the described method may include one or more of the following features: providing, with the controller, the warning notification to an electronic user device paired with the vehicle; commanding, with the controller, the ESS engine restart when the following occurs: an HVAC system operation is requested that requires the engine on, an electrical system supply voltage is below a predetermined threshold, a vehicle hood is ajar, a vehicle driver door is ajar, and a driver seat belt is unlatched.

Further areas of applicability of the teachings of the present disclosure will become apparent from the detailed description, claims and the drawings provided hereinafter, wherein like reference numerals refer to like features throughout the several views of the drawings. It should be

DETAILED DESCRIPTION

As previously discussed, current internal combustion engine vehicles equipped with an automatic engine stop-start system will shut off the engine when the vehicle comes to a full stop with the brake applied. During the full stop before a driver exits the vehicle, the transmission is shifted into PARK, which cancels the stop event and restarts the engine. One reason for the restart is to warn the driver the vehicle is still keyed on. However, this re-enables the entire aftertreatment system and causes fuel to be consumed. In some situations, such as when the vehicle has reached its final destination, it is undesirable to restart the engine.

Accordingly, described herein are systems and methods for preventing automatic engine restart during a park or temporary park event. In some examples, the system takes into account driver intentions in the following scenarios to determine whether to disable or prevent the automatic engine restart: when the driver shifts into PARK with the intention of leaving the vehicle off, when the driver shifts into PARK with the intention of shifting back to drive soon, and when the driver shifts into PARK with the intention of leaving the vehicle on. When restart is disabled after shifting into PARK, the system is configured to provide an audio, visual and/or haptic warning to alert the driver that the vehicle engine is not keyed off.

Figure 1:
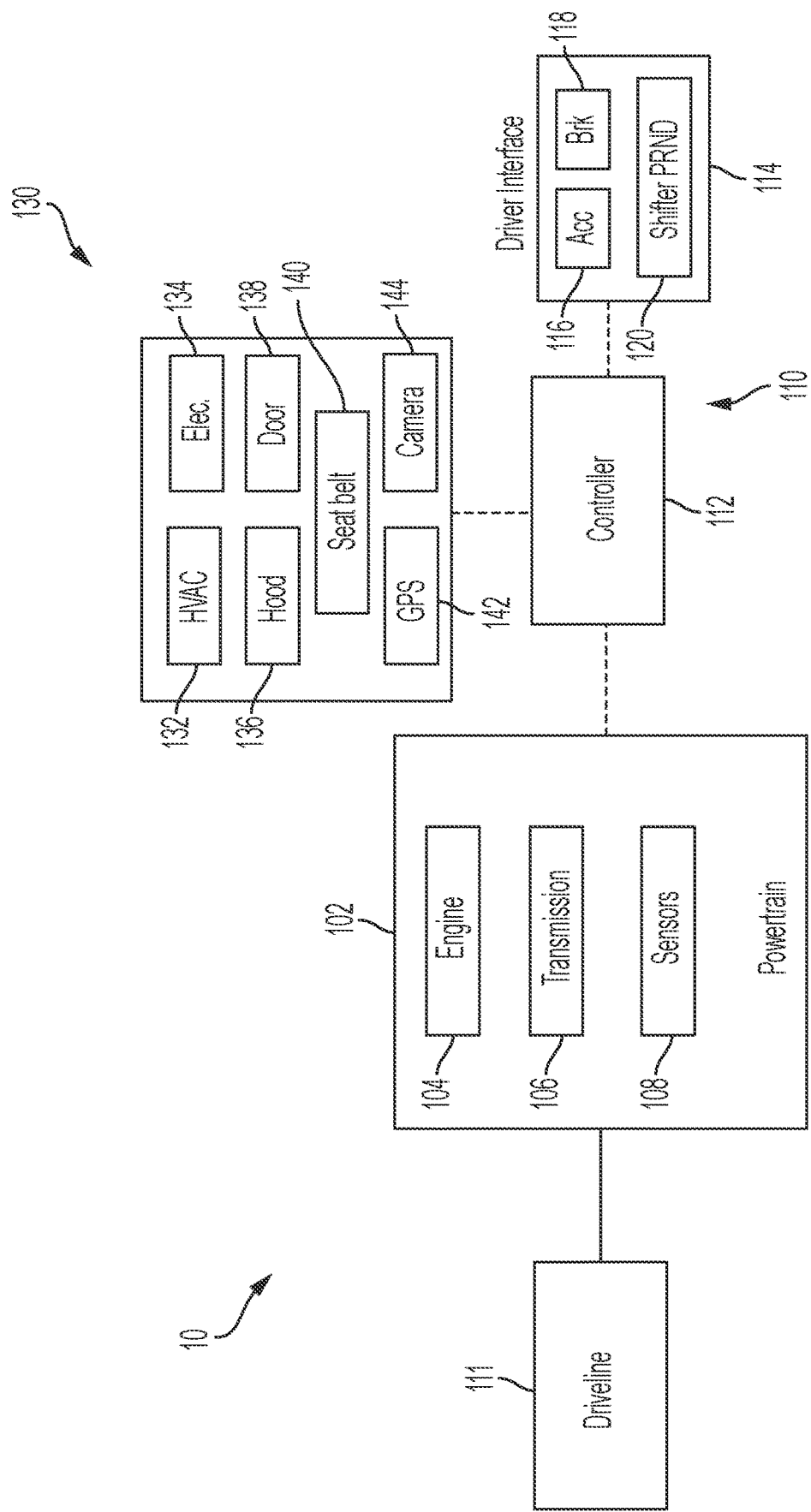
FIG. 1 is a functional block diagram of a vehicle with an automatic engine stop-start (ESS) system in accordance with the principles of the present disclosure.

Referring now to FIG. 1, a functional block diagram of an example vehicle is illustrated and generally identified at reference numeral 10. The vehicle 10 comprises a powertrain 102 including an internal combustion engine 104, a transmission 106, and one or more sensors 108 associated with the engine 104. In the example embodiment, the engine 104 is equipped with an automatic engine stop-start (ESS) system 110 configured to automatically shut off and restart a vehicle engine. The one or more sensors 108 can include, for example, a vehicle speed sensor, a vehicle deceleration sensor, a brake pedal pressure/position sensor, and an accelerator pedal pressure/position sensor. It will be appreciated that the powertrain 102 can also include other suitable components, such as an electric motor. The powertrain 102 is configured to generate drive torque that is transferred via the transmission 106 to a driveline 111 for vehicle propulsion.

A powertrain control module (PCM) or controller 112 is configured to control operation of the vehicle 10, including primarily controlling the powertrain 102 to generate a desired amount of drive torque, such as based on driver input via a driver interface 114 that includes, for example, an accelerator pedal 116, a brake pedal 118, and a gear shifter 120 (e.g., PRND). The controller 112 can also receive input/data from other components or systems 130 such as, for example, an HVAC system 132, an electrical system 134, a hood latch 136, a driver door latch 138, a driver seat belt 140, a GPS system 142, and a vehicle camera/proximity sensor system 144. The controller 112, sensors 108, driver interface 114, and additional systems 130 cooperate to provide the automatic engine stop-start system 110 for the engine 104 according to the principles of the present application.

Figure 2:
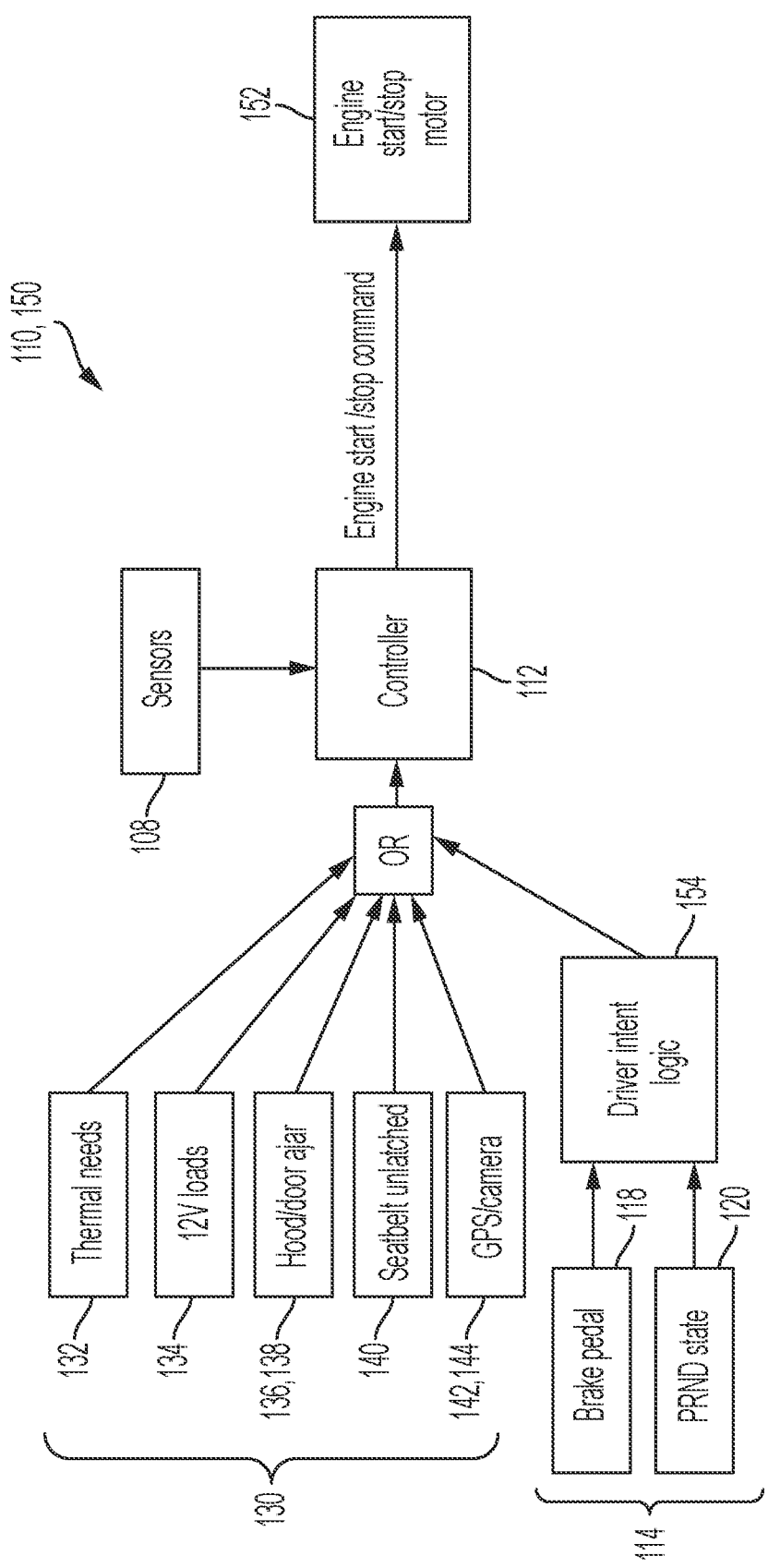
FIG. 2. illustrates a block diagram of an example architecture for the ESS system, in accordance with the principles of the present disclosure.

Referring now to FIG. 2, a functional block diagram of an example architecture 150 for the ESS system 110 is illustrated. As shown, controller 112 receives one or more input signals from sensors 108, driver interface 114, and/or components/systems 130. Based on the input signals, controller 112 is configured to control operation of an engine stop-start motor 152 to automatically shut-off or turn-on engine 104.

In the example implementation, controller 112 is configured to receive one or more signals from HVAC system 132, electrical system 134, hood latch 136, driver door latch 138, driver seat belt 140, GPS system 142, and/or vehicle camera/sensor system 144. Signals from the HVAC system 132 indicate whether HVAC operations are requested by the vehicle or vehicle occupants, and controller 112 determines if an engine stop-start is available or needed based on the signal. For example, if the ESS system 110 is engine-off and an HVAC condition is requested that requires operation of the engine 104, controller 112 commands the engine stop-start motor 152 to turn the engine on. If the engine is on and a stop condition occurs, the controller 112 may command an engine stop if there is not an HVAC request, or prevent an engine stop if there is an HVAC request.

Signals from the electrical system 134 indicate whether a system voltage is above or below a predetermined threshold, and controller 112 is configured to enable or prevent the ESS based on the received signal. For example, if the indicated voltage is below the predetermined threshold, controller 112 prevents engine-stop or turns the engine on. If the indicated voltage is above the predetermined threshold, controller 112 enables ESS operation. Signals from the hood latch 136 indicate whether the vehicle hood is latched or unlatched. If the signal indicates the hood is unlatched, controller 112 prevents ESS engine-stop or, if in ESS engine-stop, turns the engine on. This may be done, for example, to warn anyone opening the hood that the engine is keyed-on.

Signals from the driver door latch 138 indicate whether a driver door is open or closed, and controller 112 is configured to enable or prevent the ESS based on the received signal. For example, if the signal indicates the driver door is open, controller 112 prevents ESS operation or turns on the engine if in an ESS engine-stop condition. If the signal indicates the driver door is closed, controller 112 enables ESS operation. Signals from the driver seat belt 140 indicate whether a driver seat belt is latched or unlatched, and controller 112 is configured to enable or prevent the ESS based on the received signal. For example, if the signal indicates the driver seat belt is unlatched, controller 112 prevents ESS operation or turns on the engine if in an ESS engine-stop condition. If the signal indicates the driver seat belt is latched, controller 112 enables ESS operation.

Signals from the GPS system 142 and/or vehicle camera/sensor system 144 indicate if the vehicle is in a location where the driver is likely to exit the vehicle. For example, the signal may indicate the vehicle is in a parking lot (e.g., GPS signal) or parked in a parking spot (e.g., camera detects lines of a parking spot). If the vehicle is in an ESS engine-stop condition and shifts the vehicle into PARK, and the signal indicates the vehicle is likely in a final destination, controller 112 may prevent engine-start to conserve fuel.

In the example embodiment, controller 112 is also configured to receive one or more signals from the driver interface 114, including accelerator pedal 116, brake pedal 118, and gear shifter 120. Signals from the accelerator pedal 116 indicate a driver request to accelerate the vehicle, and based on such signals, controller 112 is configured to prevent ESS operation and, if the engine is in an ESS engine-stop, subsequently turn the engine on. Signals from the brake pedal 118 indicate a driver request to brake or unbrake the vehicle. For example, if the signal indicates the brake pedal 118 is pressed and the vehicle is stopped (e.g., indicated from sensor 108), the controller 112 is configured to command the ESS motor 152 to shut off the engine. If a subsequent signal indicates the brake pedal 118 is released (and the vehicle is in DRIVE), the controller 112 is configured to command the ESS motor 152 to turn on the engine.

Signals from the gear shifter 120 indicate a change in gear of the vehicle, and based on the signals, controller 112 is configured to enable/disable ESS operation or turn-on/turn-off the engine. In some examples, when in an ESS engine-stop condition, controller 112 is configured to turn on the engine when at least two conditions are met. For example, controller 112 may only turn the engine on if a first signal indicates the vehicle is shifted into DRIVE or REVERSE, and a second signal indicates the brake pedal 118 released.

In some examples, signals from sensor 108, the driver interface 114, and/or additional systems 130 are input into a driver intent logic 154, which interprets the series of inputs to determine a driver's/operator's desired/anticipated state of the vehicle. Example situations when driver intent logic 154 determines the driver desired/anticipated vehicle state include: proximity sensors 144 determining the vehicle is stopped in a parking spot (e.g., camera/sensors 144 detect solid lines on the sides of the vehicle); camera/sensors 144 determining the vehicle has stopped near a building or other vehicles; and camera/sensors 144 determining the vehicle has stopped in a garage. Such situations can be determined on a single case evaluation, as a learned trait condition from repeated parking of the vehicle in similar/same GPS coordinates, and/or other vehicle state determination. Additional examples include feeding map data (e.g., from GPS system 142) into the driver intent logic 154 such as when the vehicle reaches a 'HOME' location, or if a repeated event (e.g., ignition-off) occurs in a recurring GPS location. Even when one of the above situations occur, the driver intent logic 154 is configured to cancel the continued stop event determination upon an additional condition such as, for example, a response from the hood latch 136 being open, the accelerator pedal 116 depressed a predetermined amount (e.g., intends to accelerate), or determining the vehicle is not in a predetermined parking location (e.g., an intersection, a stop light, a stop sign, etc.).

Based on data input (e.g., from the signals, look up table, probability map, etc.), the driver intent logic 154 sends a signal to controller 112 indicating a driver intent such as, for example, intention of leaving the vehicle off, shifting back to drive soon, or leaving the vehicle on.

In one example embodiment, when signals from the driver intent logic 154 are received indicating the driver shifts to PARK with the intention of leaving the vehicle off, controller 112 is configured to prevent the ESS motor 152 from turning the engine on and provides a warning to the driver that the engine is still keyed-on (e.g., active). For example, the warning may be an audible warning (e.g., car horn, chirp, etc.), a visual warning (e.g., warning displayed on an infotainment display screen, instrument panel cluster, etc.), and/or a haptic warning (e.g., vibrating driver seat, steering wheel, etc.). The warning may be performed periodically after a predetermined amount of time (e.g., every 30 seconds). Additionally or alternatively, if the user has a device (e.g., smartphone) paired with the vehicle, the warning notification may also be sent to the user's device.

In one example embodiment, when signals from the driver intent logic 154 are received indicating the driver shifts to PARK with the intention of shifting back to drive soon (e.g., within in a predetermined time), controller 112 is configured to prevent engine restart when the gear shifter 120 is shifted into PARK and the brake pedal 118 is released. The controller 112 is configured to command restart of the engine when the gear shifter 120 is subsequently shifted to DRIVE or REVERSE and the brake pedal 118 is released. Such control is configured to reduce fuel consumption, emissions, and wear, for example, when the vehicle is in a drive-thru, waiting in a parking lot, etc.

In one example embodiment, when signals from the driver intent logic 154 are received indicating the driver shifts to PARK with the intention of leaving the vehicle on, controller 112 is configured to prevent engine restart when the gear shifter 120 is shifted into PARK and the brake pedal 118 is released. Controller 112 subsequently monitors signals from HVAC system 132, electrical system 134, hood latch 136, driver door latch 138, and driver seat belt 140 to determine if the engine should be commanded to restart. Such control is configured to allow the vehicle to maintain temperatures and radio until an engine restart is required.

Figure 3:
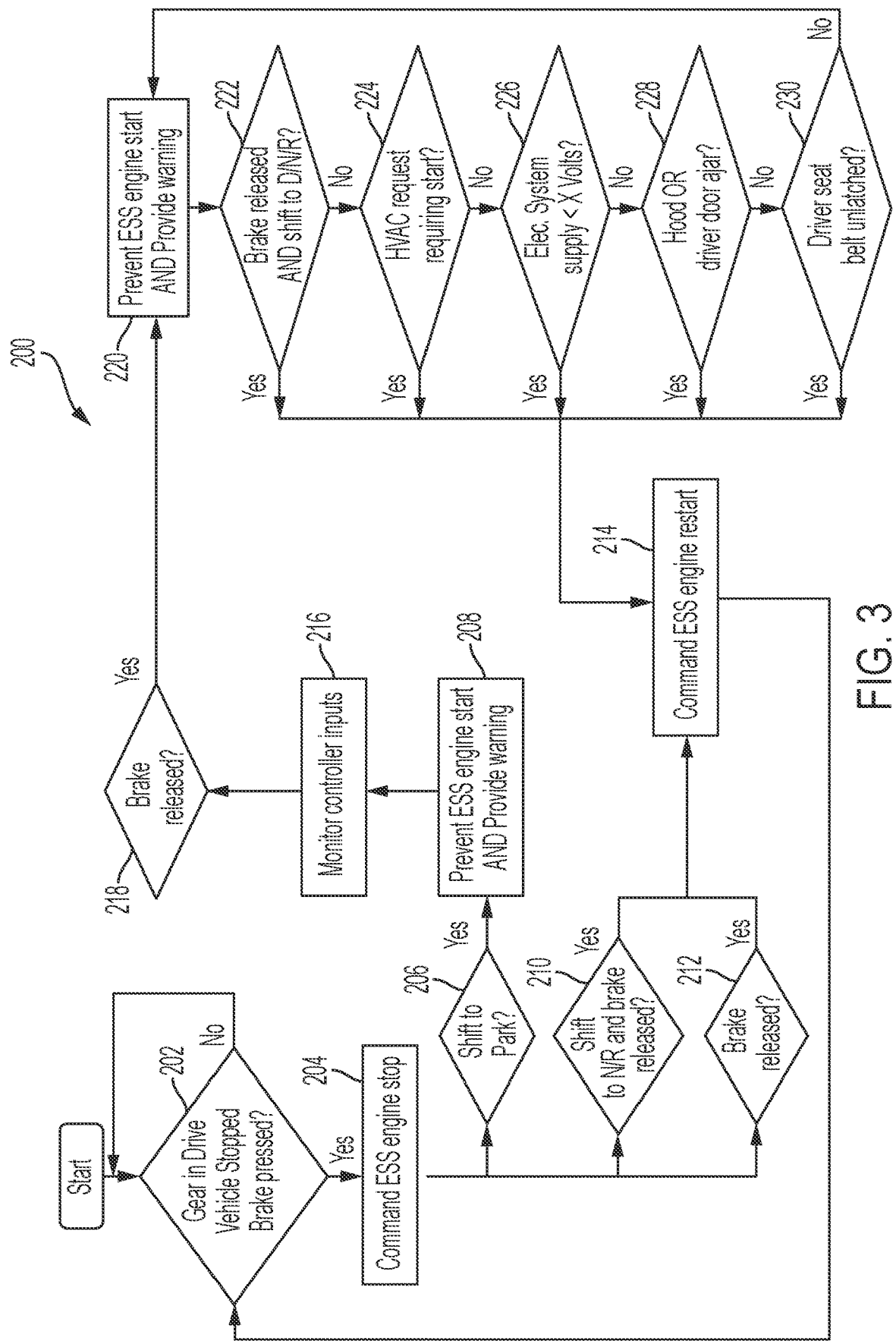
FIG. 3 illustrates a method of controlling the ESS system shown in FIGS. 1 and 2, in accordance with the principles of the present disclosure.

Turning now to FIG. 3, an example method 200 of operating vehicle 10 and ESS system 110 is provided in accordance with the principles of the present application. The method begins at step 202 where controller 112 determines if the gear shifter 120 is in DRIVE, the vehicle 10 is stopped, and brake pedal 118 is pressed. If yes, at step 204, controller 112 commands an ESS engine stop. At step 206, controller 112 determines if gear shifter 120 is shifted to PARK. If yes, at step 208, controller 112 prevents ESS engine start and provides a warning notification (e.g., audio/visual/haptic) to the driver that the engine is still operational or keyed-on. At step 210, controller 112 determines if gear shifter 120 is shifted to NEUTRAL or REVERSE. If yes, control proceeds to step 214 and controller 112 commands an ESS engine restart. At step 212, controller 112 determines if brake pedal 118 is released. If yes, control proceeds to step 214 and controller 112 commands an ESS engine restart.

Returning to step 208, while controller 112 prevents ESS restart and provides the driver warning notification, at step 216, the controller 112 continues to monitor input signals from sensors 108, driver interface 114, and/or components/systems 130. At step 218, controller 112 determines if the brake pedal 118 is released. If yes, control proceeds to step 220 and controller 112 continues to prevent ESS engine restart and provide the warning. At step 222, controller 112 determines if the brake pedal 118 is released and the gear shifter 120 is shifted to DRIVE, NEUTRAL, or REVERSE. If yes, control proceeds to step 214 and controller 112 commands ESS engine restart. If no, control proceeds to step 224.

At step 224, controller 112 determines if a request from HVAC system 132 requires an engine restart (e.g., air conditioning requested). If yes, control proceeds to step 214. If no, control proceeds to step 226 and controller 112 determines if a system voltage of electrical system 134 is below a predetermined threshold. If yes, control proceeds to step 214. If no, control proceeds to step 228 and controller 112 determines if the hood latch 136 or the driver door latch 138 are unlatched. If yes, control proceeds to step 214. If no, control proceeds to step 230 and controller 112 determines if the driver seat belt 140 is unlatched. If yes, control proceeds to step 214. If no, control returns to step 220 until the vehicle is keyed-off.

Described herein are systems and methods for operating an automatic engine stop-start system to reduce fuel consumption, emissions, and wear. The system is configured to command an engine stop when the vehicle is in drive, the vehicle is stopped, and the brake is pressed. However, unlike typical systems, if the vehicle is shifted into park, the controller prevents the automatic engine restart and instead provides a warning notification to the driver that the engine is still keyed-on. This is particularly convenient when the driver intends to exit the vehicle or remain parked for a short period of time, such as in a drive-thru. As noted, fuel consumption, emissions, and wear are reduced by not restarting the engine.

As used herein, the term module or controller or control module refers to an application specific integrated circuit (ASIC), an electronic circuit, a processor (shared, dedicated, or group) and memory that executes one or more software or firmware programs, a combinational logic circuit, and/or other suitable components that provide the described functionality.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An automatic engine stop-start (ESS) system for a vehicle with an internal combustion engine, the ESS system comprising:
   a brake pedal;
   a gear shifter configured to shift a transmission between park, reverse, neutral, and drive; and
   a controller configured to:
      command an ESS engine stop when the gear shifter is in drive, the vehicle is stopped, and the brake pedal is pressed;
      prevent an ESS engine restart when the gear shifter is shifted from drive to park; and
      provide, when the ESS engine restart is prevented, a warning notification to a driver that the engine is keyed-on.

2. The ESS system of claim 1, wherein the controller includes a driver intent logic configured to interpret a series of inputs to determine a desired/anticipated vehicle state of an operator of the vehicle, wherein the ESS engine restart is commanded or prevented based on a signal from the driver intent logic.

3. The ESS system of claim 2, wherein the driver intent logic provides a signal indicating to prevent the ESS engine restart when a vehicle camera/proximity sensor system indicates the vehicle is stopped in a parking spot, near a building, or in a garage.

4. The ESS system of claim 2, wherein the driver intent logic provides a signal indicating to prevent the ESS engine restart when a vehicle GPS system and/or map data indicate the vehicle has reached a HOME location or a recurring ignition-off location.

5. The ESS system of claim 1, wherein the controller is further configured to continue to prevent the ESS engine restart and provide the warning notification if the gear shifter remains in park and the brake pedal is released.

6. The ESS system of claim 1, wherein the controller is further configured to command the ESS engine restart when the brake pedal is pressed and the gear shifter is shifted from park to drive or reverse.

7. The ESS system of claim 1, wherein the warning notification is an audible warning.

8. The ESS system of claim 1, wherein the warning notification is a visual warning displayed on a vehicle display or a haptic warning.

9. The ESS system of claim 1, wherein the controller is configured to provide the warning notification to an electronic user device paired with the vehicle.

10. The ESS system of claim 1, wherein the controller is further configured to perform the ESS engine restart when at least one of the following occurs:
    an HVAC system operation is requested that requires the engine on; and
    an electrical system supply voltage is below a predetermined threshold.

11. The ESS system of claim 1, wherein the controller is further configured to perform the ESS engine restart when a vehicle hood is ajar, a vehicle driver door is ajar, or a driver seat belt is unlatched.

12. A method of controlling an automatic engine stop-start (ESS) system for a vehicle having an internal combustion engine, the method comprising:
    monitoring, with a controller, a brake pedal to determine if the brake pedal is pressed or released;
    monitoring, with the controller, a position of a gear shifter configured to shift a transmission between park, reverse, neutral, and drive;
    commanding, with the controller, an ESS engine stop when the gear shifter is in drive, the vehicle is stopped, and the brake pedal is pressed;
    preventing, with the controller, an ESS engine restart when the gear shifter is shifted from drive to park; and
    providing, with the controller, a warning notification to a driver that the engine is keyed-on when the ESS engine restart is prevented.

13. The method of claim 12, wherein the controller includes a driver intent logic configured to interpret a series of inputs to determine a desired/anticipated vehicle state of an operator of the vehicle, wherein the ESS engine restart is commanded or prevented based on a signal from the driver intent logic.

14. The method of claim 13, further comprising:
    providing a signal from the driver intent logic indicating to prevent the ESS engine restart when a vehicle camera/proximity sensor system indicates the vehicle is stopped in a parking spot, near a building, or in a garage; and
    providing a signal from the driver intent logic indicating to prevent the ESS engine restart when a vehicle GPS system and/or map data indicate the vehicle has reached a HOME location or a recurring ignition-off location.

15. The method of claim 12, further comprising continuing to prevent the ESS engine restart and provide the warning notification if the gear shifter remains in park and the brake pedal is released.

16. The method of claim 12, further comprising commanding, with the controller, the ESS engine restart when the brake pedal is pressed and the gear shifter is shifted from park to drive or reverse.

17. The method of claim 12, wherein the warning notification is at least one of an audible warning, a visual warning displayed on a vehicle display, and a haptic warning.

18. The method of claim 12, further comprising providing, with the controller, the warning notification to an electronic user device paired with the vehicle.

19. The method of claim 12, further comprising commanding, with the controller, the ESS engine restart when the following occurs:
- an HVAC system operation is requested that requires the engine on;
- an electrical system supply voltage is below a predetermined threshold;
- a vehicle hood is ajar;
- a vehicle driver door is ajar; and
- a driver seat belt is unlatched.

* * * * *